US007675536B2

(12) United States Patent
Palumbo et al.

(10) Patent No.: US 7,675,536 B2
(45) Date of Patent: Mar. 9, 2010

(54) ARCHITECTURES FOR MULTI-FUNCTIONAL IMAGE FORMING DEVICES

(75) Inventors: Franklin Joseph Palumbo, Nicholasville, KY (US); Darin M. Gettelfinger, Lexington, KY (US); Francis Foldes, Jr., Lexington, KY (US); Steven David Sieckowski, Lexington, KY (US); Paul Douglas Horrall, Lexington, KY (US); Reginald Keith Bethel, Lexington, KY (US)

(73) Assignee: Lexmark International, Inc., Lexington, KY (US)

( * ) Notice: Subject to any disclaimer, the term of this patent is extended or adjusted under 35 U.S.C. 154(b) by 220 days.

(21) Appl. No.: 11/407,261

(22) Filed: Apr. 19, 2006

(65) Prior Publication Data

US 2007/0247511 A1 Oct. 25, 2007

(51) Int. Cl.

*B41J 29/13* (2006.01)
*B41J 2/435* (2006.01)
*G01D 15/06* (2006.01)
*G03G 15/00* (2006.01)
*G03G 21/16* (2006.01)

(52) U.S. Cl. ....................... 347/263; 347/108; 347/170; 399/110; 399/111

(58) Field of Classification Search ................. 347/108, 347/170, 263; 399/110, 111
See application file for complete search history.

(56) References Cited

U.S. PATENT DOCUMENTS

| | | | |
|---|---|---|---|
| 4,009,958 | A | 3/1977 | Kurita et al. |
| 4,386,838 | A | 6/1983 | Hirabayashi et al. |
| 4,432,632 | A | 2/1984 | Yokota |
| 4,585,329 | A | 4/1986 | Landa |
| 4,615,605 | A | 10/1986 | Kida et al. |
| 4,639,119 | A | 1/1987 | Isaka |
| 4,657,372 | A | 4/1987 | Ikeda et al. |
| 4,678,318 | A | 7/1987 | Bisaiji |
| 4,692,018 | A | 9/1987 | Tamura |
| 4,757,344 | A | 7/1988 | Idenawa et al. |
| 4,761,667 | A | 8/1988 | Miyai et al. |
| 4,791,454 | A | 12/1988 | Takahashi et al. |
| 4,862,212 | A | 8/1989 | Tanzawa et al. |
| 4,866,482 | A | 9/1989 | Hirasawa et al. |
| 4,873,548 | A | 10/1989 | Kobayashi et al. |
| 4,901,110 | A | 2/1990 | Tompkins et al. |
| 4,924,267 | A | 5/1990 | Yoshikawa et al. |
| 4,926,219 | A | 5/1990 | Hirasawa et al. |
| 4,943,828 | A | 7/1990 | Manabe et al. |
| 4,987,446 | A | 1/1991 | Mochimaru et al. |

(Continued)

*Primary Examiner*—Matthew Luu
*Assistant Examiner*—Kendrick X Liu
(74) *Attorney, Agent, or Firm*—David Kalish; John Victor Pezdek

(57) ABSTRACT

Multi-functional image forming devices that may include a base color laser printer comprising a front side, a back side, a top, and a bottom. The color laser printer may further include a media path, a laser printhead, and a plurality of image forming units. A scanning mechanism comprising a scan bed may be mounted on the top of the base color laser printer. In one embodiment, the media path includes a first section positioned within the base color laser printer and a second section that extends between the scanning mechanism and the top of the base color laser printer. In one embodiment, the scanning mechanism is pivotally mounted to the base color laser printer and movable to access the second section of the media path.

22 Claims, 5 Drawing Sheets

U.S. PATENT DOCUMENTS

| | | | | |
|---|---|---|---|---|
| 5,027,158 | A | | 6/1991 | Tompkins et al. |
| 5,061,959 | A | | 10/1991 | Kinoshita et al. |
| 5,153,640 | A | | 10/1992 | Okabe |
| 5,160,963 | A | | 11/1992 | Haneda et al. |
| 5,160,964 | A | | 11/1992 | Takahashi et al. |
| 5,170,209 | A | | 12/1992 | Tompkins et al. |
| 5,189,471 | A | | 2/1993 | Irihara et al. |
| 5,266,998 | A | | 11/1993 | Lee |
| 5,276,479 | A | | 1/1994 | Inomata |
| 5,294,960 | A | | 3/1994 | Nomura et al. |
| 5,309,211 | A | | 5/1994 | Yoshioka |
| 5,323,210 | A | | 6/1994 | Inomata |
| 5,367,363 | A | | 11/1994 | Kai et al. |
| 5,371,575 | A | | 12/1994 | Sekino et al. |
| 5,402,212 | A | | 3/1995 | Ito et al. |
| 5,440,373 | A | | 8/1995 | Deki et al. |
| 5,442,421 | A | | 8/1995 | Kojima |
| 5,452,064 | A | | 9/1995 | Inomata |
| 5,528,343 | A | | 6/1996 | Tada et al. |
| 5,537,187 | A | | 7/1996 | Sekine |
| 5,585,889 | A | | 12/1996 | Shishido et al. |
| 5,604,570 | A | | 2/1997 | Jeran et al. |
| 5,646,720 | A | | 7/1997 | Song |
| 5,666,599 | A | | 9/1997 | Miyasaka et al. |
| 5,682,579 | A | | 10/1997 | Nomura et al. |
| 5,699,091 | A | | 12/1997 | Bullock et al. |
| 5,742,319 | A | | 4/1998 | Fukunaga et al. |
| 5,787,324 | A | | 7/1998 | Iwasaki |
| 5,802,432 | A | | 9/1998 | Coffey et al. |
| 5,815,664 | A | | 9/1998 | Asano |
| 5,815,775 | A | | 9/1998 | Miyasaka et al. |
| 5,907,749 | A | | 5/1999 | Nomura et al. |
| 5,920,752 | A | | 7/1999 | Karakama et al. |
| 5,953,559 | A | | 9/1999 | Obu |
| 5,966,566 | A | | 10/1999 | Odagawa et al. |
| 6,085,051 | A | | 7/2000 | Miyasaka et al. |
| 6,118,961 | A | | 9/2000 | Nomura et al. |
| 6,163,666 | A | | 12/2000 | Hosokawa et al. |
| 6,263,185 | B1 | * | 7/2001 | Kato et al. .................. 399/381 |
| 6,347,204 | B1 | | 2/2002 | Kurosawa |
| 6,377,765 | B1 | | 4/2002 | Shishido et al. |
| 6,381,428 | B1 | | 4/2002 | Yamamoto et al. |
| 6,384,940 | B1 | * | 5/2002 | Kawai et al. ................ 358/474 |
| 6,445,895 | B2 | | 9/2002 | Shirasawa et al. |
| 6,484,003 | B2 | | 11/2002 | Tokutake et al. |
| 6,501,925 | B2 | | 12/2002 | Yamamoto et al. |
| 6,697,586 | B2 | | 2/2004 | Yamamoto et al. |
| 6,798,430 | B2 | | 9/2004 | Sato |
| 2001/0028810 | A1 | | 10/2001 | Yamaguchi et al. |
| 2003/0016381 | A1 | * | 1/2003 | Taniguchi .................. 358/1.15 |
| 2003/0049047 | A1 | * | 3/2003 | Suzuki et al. ............... 399/124 |
| 2004/0022555 | A1 | * | 2/2004 | Sato et al. ................... 399/107 |
| 2004/0130732 | A1 | * | 7/2004 | Denpo ........................ 358/1.1 |
| 2004/0165910 | A1 | * | 8/2004 | Sato et al. ................... 399/116 |
| 2005/0031371 | A1 | * | 2/2005 | Kaida et al. ................. 399/110 |
| 2005/0035523 | A1 | * | 2/2005 | Triplett et al. .............. 271/3.14 |
| 2005/0151782 | A1 | * | 7/2005 | Ishida et al. .................. 347/37 |

* cited by examiner

ARCHITECTURES FOR MULTI-FUNCTIONAL IMAGE FORMING DEVICES

BACKGROUND

The present application is directed to architectures for image forming devices and, more specifically, to architectures of a base printer and a scanning mechanism to provide printing, faxing, scanning, and copying capabilities.

A printer, such as a color laser printer, produces images on a media sheet that passes along a media path. The printer may further include additional functionality to also fax, scan, and copy. A single device that includes these functions is often referred to as an all-in-one (AIO) or multi-functional image forming device.

One drawback to previous multi-functional devices is their relatively large size. The additional components necessary for the additional functionality causes an increase in the overall size of the device. The overall size is an important aspect for consumers when purchasing a device. Workspace, such as a desk top, is often limited and is not able to accommodate a large device. Further, larger devices are more difficult to physically lift and move around ones workspace. Smaller devices are more convenient for moving and positioning in new locations.

Another purchasing aspect for multi-functional devices is their ease of use. Input areas for inserting media sheets into the device and output areas for receiving sheets from the device should be positioned in accessible locations. The locations should provide for straight-forward loading and unloading of the media sheets without moving the device.

Another purchasing aspect is the overall cost of the device. The architecture of the devices should not greatly affect the cost of the device. An architecture that causes an increase in the overall cost may be a detriment to a consumer.

SUMMARY

The present application is directed to multi-function image forming devices. In one embodiment, the device includes a base color laser printer comprising a front side, a back side, a top, and a bottom. The color laser printer further includes a media path, a laser printhead, a plurality of image forming units, and a plurality of toner reservoirs. A scanning mechanism comprising a scan bed is mounted on the top of the base color laser printer. In one embodiment, the media path includes a first section positioned within the base color laser printer and a second section that extends between the scanning mechanism and the top of the base color laser printer. In one embodiment, the scanning mechanism is pivotally mounted to the base color laser printer and movable to access the plurality of toner reservoirs.

DETAILED DESCRIPTION

The present application is directed to multi-functional devices including a base printer and a scanning mechanism that together provide printing, faxing, scanning, and copying capabilities. The multi-functional devices include an architecture that minimizes an overall size. The architecture may also provide straight-forward access to the input and output ports, and also not negatively affect the overall cost of the device.

In one embodiment, the multi-functional device includes a base printer that receives a scanning device. The base printer may be a stand-alone device that is able to produce mono or color images. The scanning device is adapted to mount to the base printer and combine the functionality of the base printer with the functionality of scanning device. The combined multi-functional device is able to print, scan, fax, and copy. Further, the combined device has a small overall size and accessible work areas.

Figure 1A:
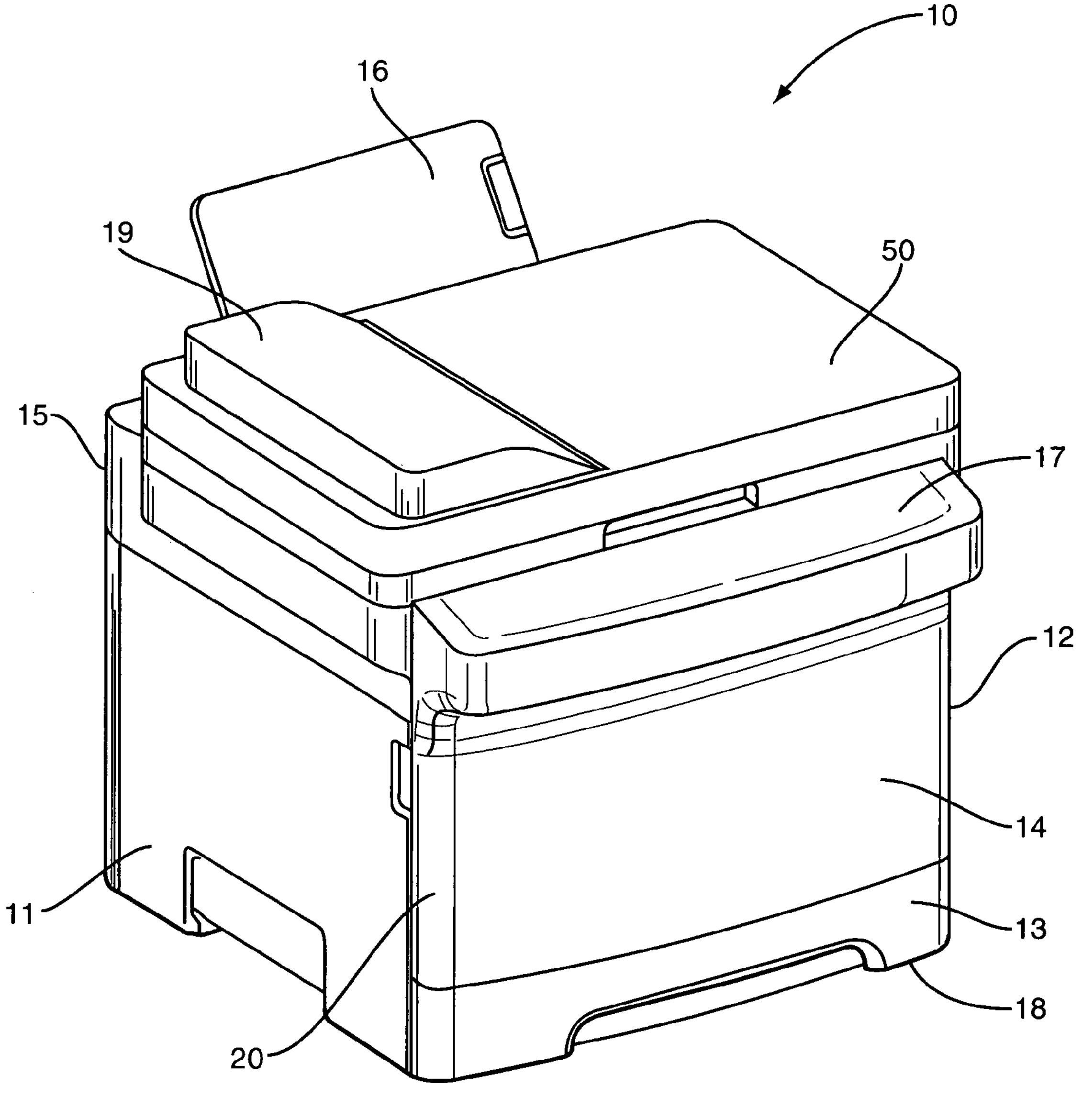
FIG. 1A is a perspective view illustrating a multi-functional device in a first orientation according to one embodiment.

FIG. 1A illustrates one embodiment of the combined device, generally illustrated as 10. The device 10 includes a base printer 20 and an attached scanning mechanism 50. For purposes of reference, the device 10 has a front 14, a back 15, first side 11, and second side 12. An input tray 13 is removable through the front 14. The height of the device 10 is measured as the distance between a bottom 18 and a top 19. A depth of the device 10 is measured between the front 14 and back 15. The scanning mechanism 50 is positioned on the top of the base printer 20. A control panel 17 is positioned on the front 14 to control the operation of the device 10.

In one embodiment, the base printer 20 may be sold as a complete separate unit for printing images on media sheets. Further, the base printer 20 may be slightly modified to accept the scanning mechanism 50 and thereby add fax, scan, and copy functionality. Separate components may therefore not be necessary because of the ability of the base printer 20 to receive the scanning mechanism 50.

Figure 1B:
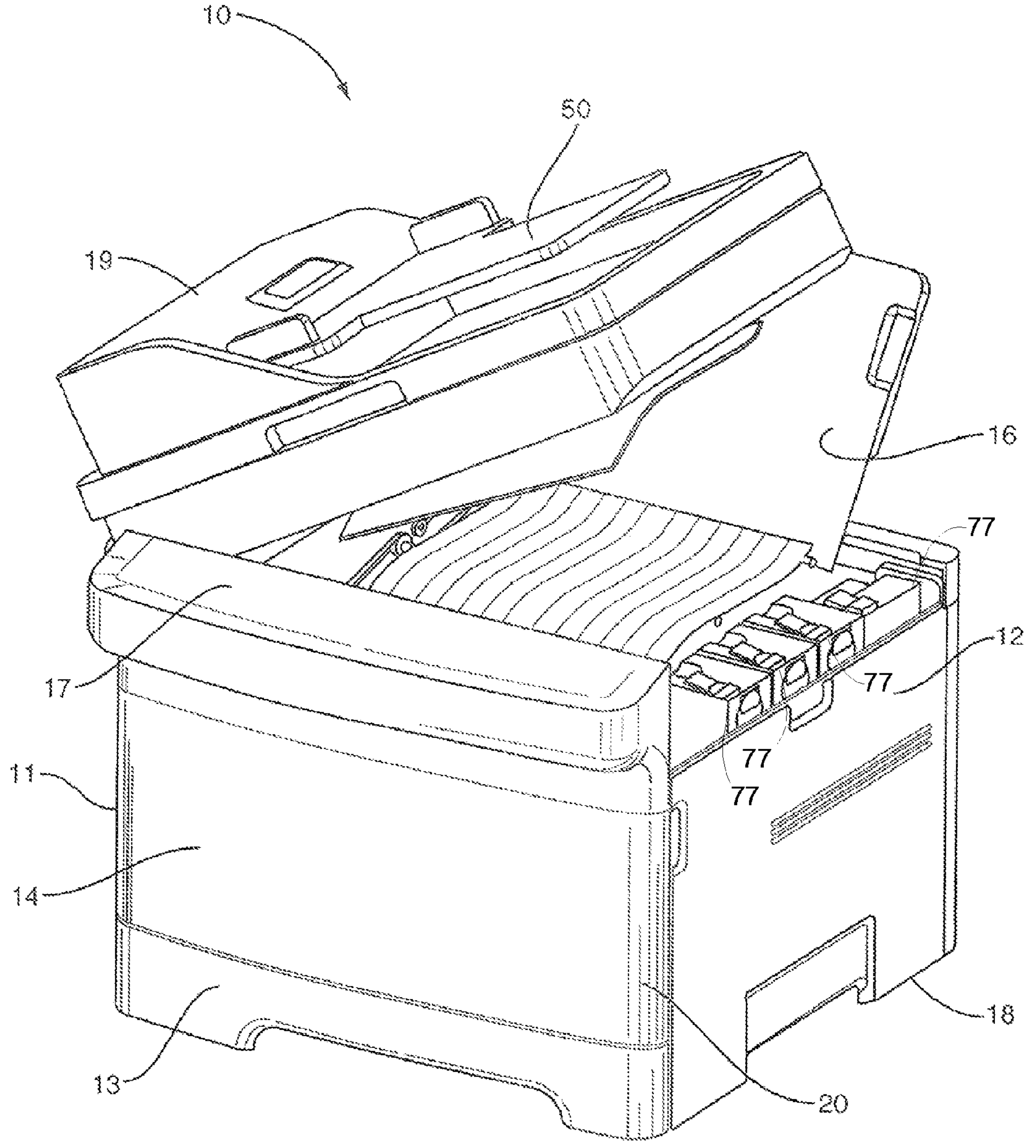
FIG. 1B is a perspective view illustrating a multi-functional device in a second orientation according to one embodiment.

FIG. 1A illustrates the scanning mechanism 50 in a first orientation. FIG. 1B illustrates the scanning mechanism 50 in a second orientation. In one embodiment, the scanning mechanism 50 should be in the first orientation for the device 10 to fully operate. In one embodiment as illustrated in FIG. 1B, the scanning mechanism 50 is pivotally attached to the base printer 20 in proximity to the first side 11. Moving the scanning mechanism 50 to the second orientation provides for accessing an interior of the base printer 20 as will be explained in more detail below.

Figure 2:
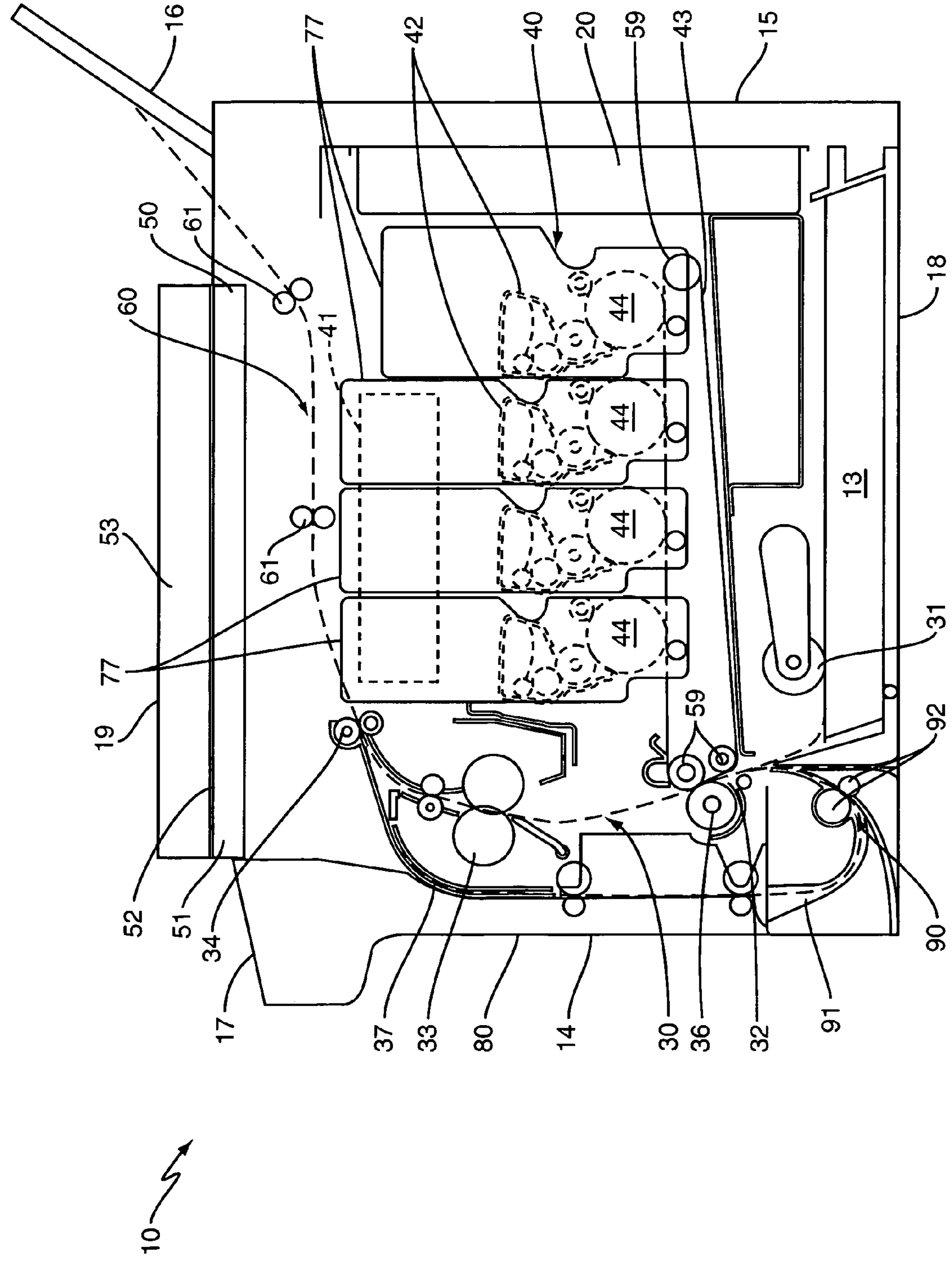
FIG. 2 is a side schematic view illustrating a multi-functional device according to one embodiment.

As illustrated in FIG. 2, the base printer 20 includes a media path 30 that extends between the input tray 13 and discharge rollers 34. The input tray 13 is sized to contain a stack of media sheets. A pick mechanism 31 is positioned adjacent to the input tray 13 for moving a top-most sheet from the tray 13. The input tray 13 is positioned at the bottom 18 of the base printer 20, and may be removed from the front 14 of the base printer 20 for reloading or changing media sheets.

Media path 30 further includes a second transfer area 32 where toner images on an intermediate transfer belt 43 are transferred to a media sheet. The media sheet receives the toner image while passing through a nip formed between a second transfer roll 36 and support roll 59. A fuser 33 is positioned downstream along the media path 30 for fusing the toner onto the media sheet. A section of the media path 30 between the input tray 13 and the discharge rollers 34 is positioned in proximity to the front 14 of the base printer 20.

In one embodiment, the second transfer area 32 and the fuser 33 are positioned along this vertical section.

Discharge rollers 34 are located downstream from the fuser 33 and may be rotated in either forward or reverse. In a forward direction, the discharge rollers 34 move the media sheet from the base printer 20 and into a second section 60 of the media path 30. In a reverse direction, the discharge rollers 34 move the media sheet into a duplex path 37. Duplex path 37 includes a series of rollers for moving the media sheet to a point upstream from the second transfer area 32 for receiving a toner image on a second side of the media sheet. In one embodiment, the duplex path 37 is positioned between the front 14 of the base printer 20 and the vertical section of the media path 30. A feed path 90 may be positioned on the front 14 of the base printer 20 to move media sheets to the second transfer area 32. In one embodiment, feed path 90 includes an inlet 91 for inserting the media sheets and one or more rollers 92 that move the sheets to the second transfer area 32. In one embodiment, the inlet 91 is positioned within the input tray 13.

Figure 3:
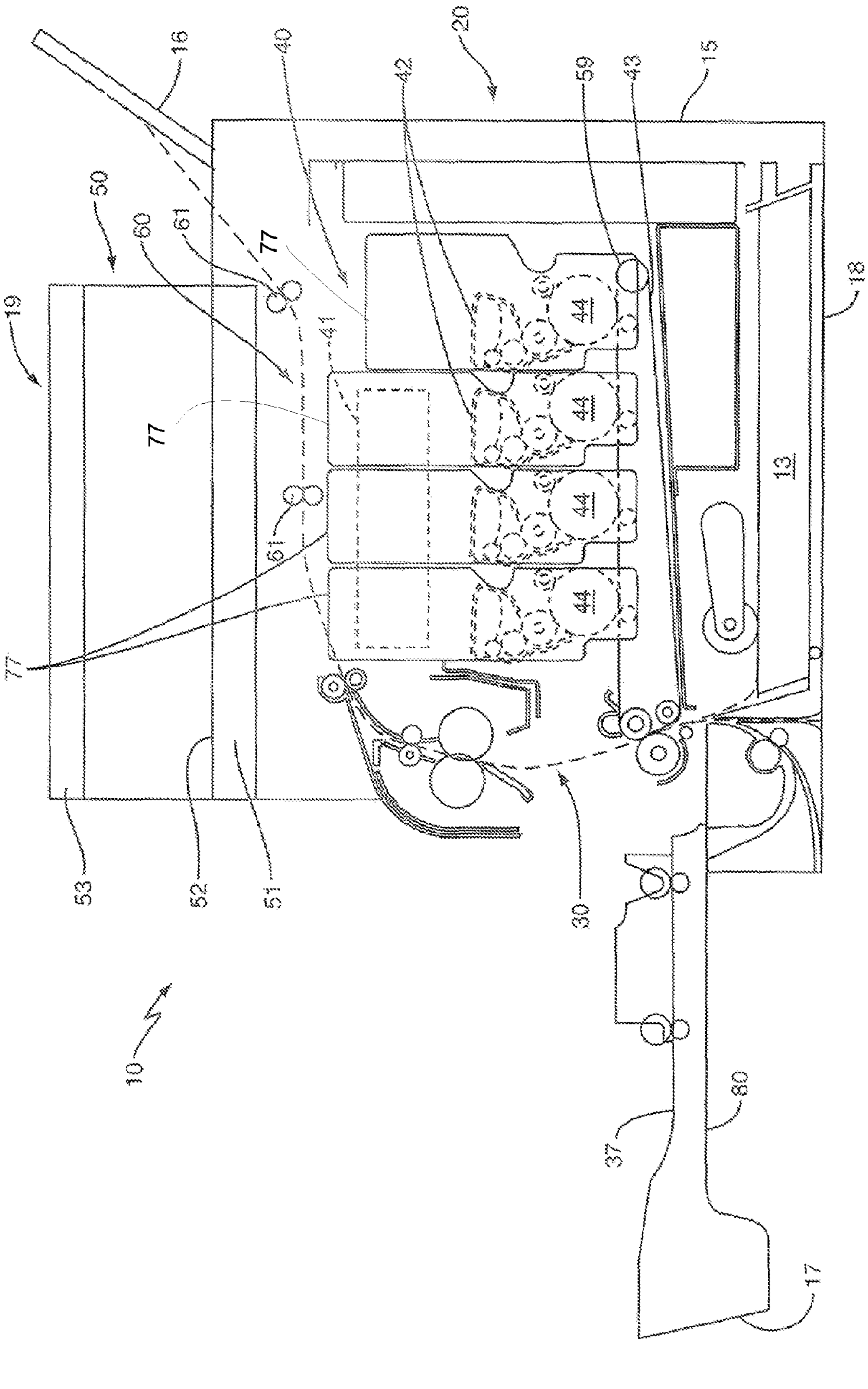
FIG. 3 is a schematic view of a multi-functional device according to one embodiment.

As illustrated in FIG. 3, an access door 80 may be positioned on the front 14 of the base printer 20. In one embodiment, access door 80 comprises a first side of the media path 30. In an open orientation as illustrated in FIG. 3, the door 80 provides access to the media path 30 to remove potentially jammed sheets. In a closed orientation as illustrated in FIG. 2, the access door 80 forms a first side of the media path 30. In another embodiment, access door 80 provides access to the duplex path 37. The access door 80 comprises a first side of the duplex path 37 and in an open orientation provides access to media sheets that are potentially jammed along the path 37. In a closed orientation, door 80 forms the outer half of the path 37. In one embodiment, the control panel 17 is positioned on the access door 80. When the door 80 is in the closed orientation as illustrated in FIG. 2, the control panel 17 is accessible from the front 14 of the base printer 20. In one embodiment, a secondary display (not illustrated) is positioned on the front 14 of the base printer 20 to display the machine status when the access door 80 is in the open orientation and the control panel 17 faces away from the user.

The base printer 20 may also include an image formation area 40 including a laser printhead 41, one or more image forming units 42, and an intermediate transfer member 43. Laser printhead 41 includes a laser that discharges a surface of photoconductive members 44 within each of the image forming units 42. In one embodiment, each of the image forming units 42 includes a photoconductive member 44, and a developer member. The image forming units 42 may further include a toner adder member to move toner to the developer member. In one embodiment, four separate image forming units 42 are included within the base printer 20. In one embodiment, each image forming unit 42 is substantially the same.

In one embodiment, a toner reservoir 77 is operatively connected to each of the image forming units 42. The toner reservoirs 77 are sized to contain toner that is transferred to the image forming units 42 during image formation. The toner reservoirs 77 may be mounted and removed from the base printer 20 independently from the image forming units 42. In one embodiment, the toner reservoirs 77 each contain one of black, magenta, cyan, or yellow toner. In one embodiment, each of the toner reservoirs 77 is substantially the same. In another embodiment, the toner reservoirs 77 include different capacities. In one specific embodiment, the toner reservoir that contains black toner has a higher capacity.

In one embodiment as illustrated in FIGS. 2 and 3, the toner reservoirs mount within the base printer 20 from the top. Moving the scanning mechanism 50 to the open orientation provides access for mounting and removing the toner reservoirs 77. In one embodiment, the toner reservoirs 77 are accessible by moving the scanning mechanism 50 to the open orientation. In another embodiment, a separate door (not illustrated) on the top of the base printer 20 is opened prior to accessing the reservoirs 77. In one embodiment, the toner reservoirs 77 are each aligned along the second side 12 of the base printer 20.

The intermediate transfer member 43 extends continuously around a series of rollers 59. The member 43 receives the toner images from each of the photoconductive members 44 and moves the images to the second transfer area 32 where the toner images are transferred to the media sheet.

In the embodiment illustrated, the base printer 20 is a color laser printer. Examples of the base printer 20 include Model Nos. C750 and C752, each available from Lexmark International, Inc. of Lexington, Ky., USA. In another embodiment, the base printer 20 is a mono printer comprising a single image forming unit 42 for forming toner images in a single color. In another embodiment, the base printer 20 is a direct transfer device that transfers the toner images from the one or more photoconductive members 44 directly to the media sheet.

The scanning mechanism 50 provides for faxing, scanning, and copying images. As illustrated in FIG. 2, the scanning mechanism 50 includes a body 51 including a scanning bed 52 along an upper surface, and a cover 53 that covers the scanning bed 52 in the closed position. Scanning mechanism 50 is sized to fit along the top of the base printer 20.

In one embodiment, scanning mechanism 50 includes a scan head and a light source that illuminates the scanning bed 52. The scan head moves across the scanning bed 52 and captures light that bounces off a document that is placed on the scanning bed 52. A set of mirrors are used to send the reflected light from the media sheet to a lens. The lens focuses the light onto light sensitive diodes that then translate the amount of light into an electric current. An analog to digital converter stores the voltage readings indicating the image of the document. The digital information is sent to a controller, seen in FIG. 4 as element 100, where it is further processed as necessary. Examples of scanning mechanisms are included within Model Nos. X215, X422, and X340 available from Lexmark International, Inc. of Lexington, Ky., USA.

In one embodiment as illustrated in FIG. 3, the scanning mechanism 50 is pivotally mounted to the base printer 20. FIGS. 1A and 2 illustrate the scanning mechanism 50 in the closed orientation, and FIGS. 1B and 3 illustrate the scanning mechanism 50 in the open orientation. In the open orientation, the scanning mechanism 50 is pivoted upward to expose the base printer 20 and provide access to a second section 60 of the media path 30. In one embodiment, the scanning mechanism 50 should be pivoted upward to gain access to the toner reservoirs 77. In the closed orientation, the scanning mechanism 50 is pivoted downward to extend over the base printer 20. In one embodiment, the scanning mechanism 50 is operational in the closed orientation. In one embodiment, the scanning mechanism 50 is pivotally attached towards the first side 11 of the base printer 20.

A second section 60 of the media path 30 is positioned between the top of the base printer 20 and a bottom of the scanning mechanism 50. The second section 60 includes one or more rollers 61 that move the media sheet from the discharge rollers 34 to an output tray 16 positioned at a top, back of the device 10. In one embodiment, the output tray 16 is positioned at an acute angle relative to the base printer 20 to minimize the overall size of the device 10. In one specific embodiment, the output tray 16 is at an angle of about 60° relative to the base printer 20.

Figure 4:
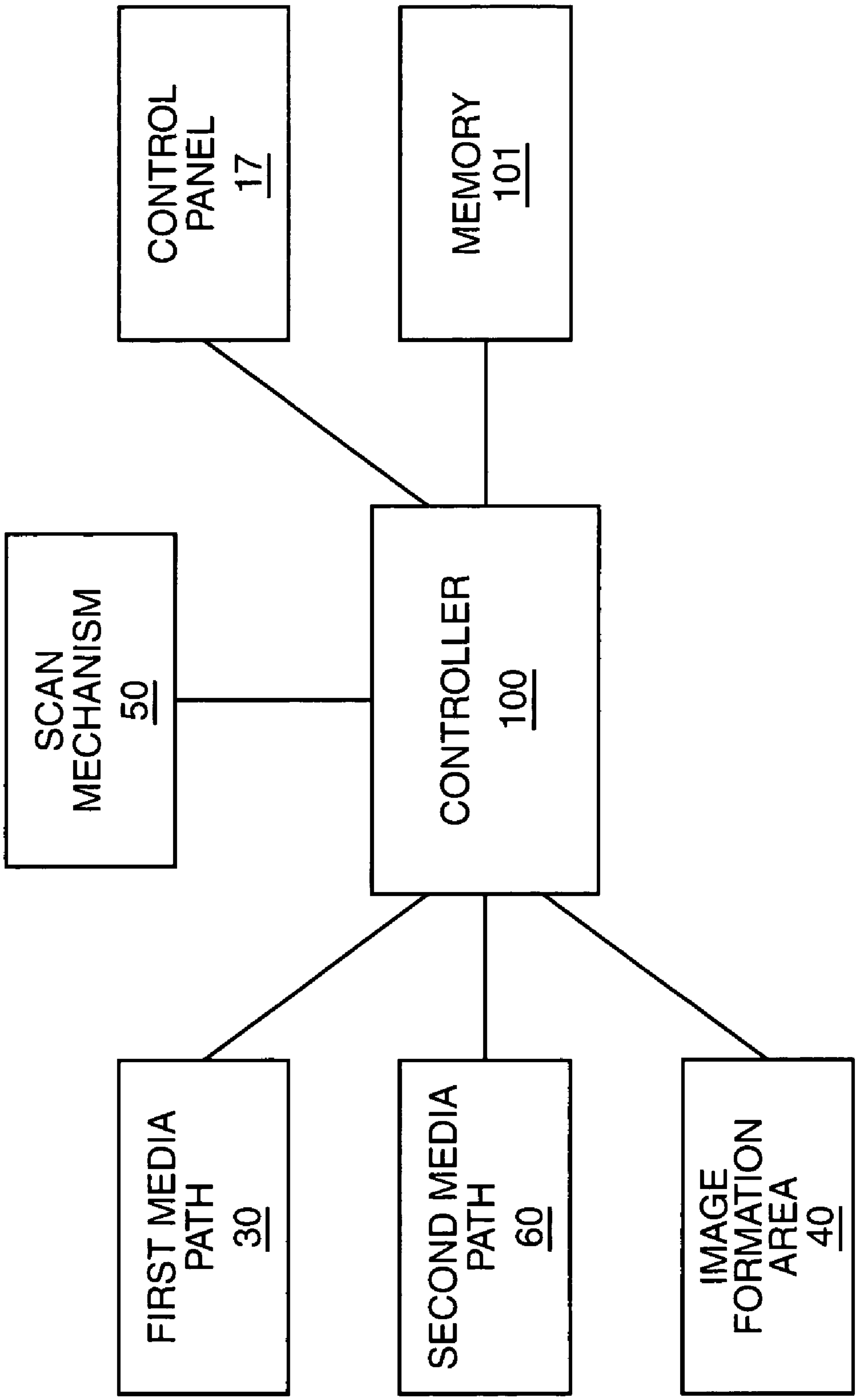
FIG. 4 is a box diagram view of a multi-functional device according to one embodiment.

A controller 100 oversees the functioning of the device 10 as illustrated in FIG. 4. Controller 100 may include a microcontroller with associated memory 101. In one embodiment, controller 100 includes a microprocessor, random access memory, read only memory, and in input/output interface. Controller 100 oversees the functioning of the base printer 20 including the media path 30, image formation area 40 and the scanning mechanism 50.

The embodiments illustrated in FIGS. 2 and 3 are directed to color laser image forming devices. The architecture of the device is also applicable to mono laser and inkjet image forming devices.

The scanning mechanism 50 may scan a single side of a document. Scanning mechanism 50 may also include a duplex path for scanning a second side of a document.

As used herein, the terms "having", "containing", "including", "comprising" and the like are open ended terms that indicate the presence of stated elements or features, but do not preclude additional elements or features. The articles "a", "an" and "the" are intended to include the plural as well as the singular, unless the context clearly indicates otherwise. The present invention may be carried out in other specific ways than those herein set forth without departing from the scope and essential characteristics of the invention. In one embodiment, an overall height of the device 10 is less than an overall depth. The present embodiments are, therefore, to be considered in all respects as illustrative and not restrictive, and all changes coming within the meaning and equivalency range of the appended claims are intended to be embraced therein.

What is claimed is:

1. A multi-functional image forming device comprising:

a base printer having a front side with a control panel and comprising a media path and an image formation section, the media path comprising an input tray positioned at a bottom of the base printer to hold a stack of media sheets and an output area positioned at a top of the base printer, the base printer including a fuser mechanism;

a scanning mechanism positioned at the top of the base printer, the scanning mechanism comprising a body including a scanning bed;

the input tray positioned below the image formation section and being removable from the front of the base printer and the output area positioned at a back of the base printer;

an output tray;

the media path comprising a first section substantially vertically positioned within the base printer, a second section adjacent to the scanning mechanism and extending between the scanning mechanism and the top of the base printer comprising the media path downstream of the fuser mechanism and upstream of the output tray, and a duplex path substantially vertically positioned proximally to the first section, the media path wrapping substantially around three sides of the image formation section; and an access door substantially forming a front side of the image forming device when in the closed position and providing access to both the first section of the media path and the duplex path when in the open position;

wherein the scanning mechanism is pivotally attached to the base printer and movable between a first position with the scanning bed being substantially parallel to the input tray and a second position with the scanning bed at an inclined angle relative to the input tray, and wherein moving the scanning mechanism in the second position provides a simultaneous access to the second section of the media path and to one or more toner reservoirs within the base printer.

2. The device of claim 1, wherein the image formation section is a color laser image formation section that further comprises a laser printhead and a plurality of image forming units.

3. The device of claim 1, wherein the scanning mechanism is pivotally attached towards a side of the base printer.

4. The device of claim 2, wherein the plurality of toner reservoirs are each operatively connected to one of the plurality of image forming units, the plurality of toner reservoirs being substantially horizontally disposed within the base printer and being independently mountable and removable from the top of the base printer when the scanning mechanism is in the second position, the second section of the media path comprising a plurality of separate roller mechanisms disposed between the fuser mechanism and the output tray, the scanning member being the only member which is moved in order to simultaneously access the toner reservoirs and the second section of the media path between a most upstream one of the one or more roller mechanisms and a most downstream one thereof.

5. The device of claim 4, wherein the scanning mechanism extends across the plurality of toner reservoirs in the first position to prevent access and is moved away from the plurality of toner reservoirs in the second position to allow removal of the plurality of toner reservoirs from the base printer and allow access to remove media jams from a section of the media path.

6. The device of claim 5, wherein the media path includes a substantially C-shape that begins at the bottom of the base printer, extends vertically along the front of the base printer, and terminates at the back of the base printer.

7. The device of claim 1, wherein the output tray is positioned at the back of the base printer at an angle of about 60 degrees relative to a horizontal portion of the base printer.

8. The device of claim 2, further comprising an intermediate transfer member that receives toner from each of the plurality of image forming units and transfers the toner towards a second transfer area of the media path.

9. The device of claim 8 wherein the access door is pivotally mounted on the front of the base printer, the access door being movable to access the duplex section and the first section of the media path between the second transfer area and the fuser mechanism.

10. The device of claim 9, further comprising a control panel positioned on the access door, the control panel facing in a first direction when the access door is in a closed orientation and facing in a second different direction when the access door is in an open orientation.

11. The device of claim 1, wherein the second section of the media path further comprises two or more separate roller mechanisms disposed between the fuser mechanism and the output tray, wherein moving the scanning mechanism to the second position provides access to the second section of the media path between a most upstream of the roller mechanisms and a most downstream one thereof.

12. A multi-functional image forming device comprising:

a base printer comprising a front side with a control panel, a back side, a top, and a bottom;

a fuser mechanism;

a media output tray;

a media path;

a scanning mechanism comprising a scan bed mounted on the top of the base printer;

the media path comprising a first section positioned within the base printer and a second section adjacent the scanning mechanism and extending between the scanning mechanism and the top of the base printer and comprising the media path downstream of the fuser mechanism and upstream of the media output tray, the first section being substantially vertically disposed with the base printer, the media path further comprising a substantially vertical duplex section disposed proximally to the first section;

an access door pivotally attached to the base printer and substantially forming a front side thereof when in the closed position and providing access to both the first section and the duplex section when in the open position; and the scanning mechanism pivotally mounted to the base printer and movable between a first position being substantially parallel to the input tray and a second position with the scanning bed at an inclined angle relative to the input tray, the scanning mechanism movable to simultaneously access the second section of the media path and a plurality of toner reservoirs in the second position.

13. The device of claim 12, further comprising a laser printhead, a plurality of image forming units, and the plurality of toner reservoirs, the image forming units and the toner reservoirs being substantially horizontally disposed within the base printer.

14. The device of claim 12, further comprising discharge rollers positioned in the second section of the media path and at least one roller mechanism in the second section of the media path downstream of the discharge rollers, the scanning mechanism providing access to the second section of the media path between the discharge rollers and the at least one roller mechanism when in the second position.

15. The device of claim 13, wherein the scanning mechanism is the only mechanism needing to be moved in order to manually access the plurality of toner reservoirs and the second section of the media path when in the second position.

16. The device of claim 14 wherein the media output tray is disposed at an angle of about 60 degrees relative to a horizontal plane, the at least one roller mechanism feeding media into the media output tray during operation of the image forming device.

17. The device of claim 13, further comprising an intermediate transfer member substantially horizontally disposed within the base printer and that receives toner from each of the plurality of image forming units and transfers the toner at a second transfer area, the access door providing access to the media path between the second transfer area and the fuser mechanism.

18. The device of claim 12, further comprising an input tray, wherein the input tray and the second section of the media path are substantially parallel, the input tray, first section and second sections of the media path forming a substantially C-shape.

19. A multi-functional image forming device comprising:

a base printer comprising a front side, a back side, a top, and a bottom;

a fuser mechanism;

a media output tray;

a scanning mechanism mounted on the top of the base printer;

a media path comprising a first section positioned within the base printer and a second section adjacent the scanning mechanism and extending along a space formed between the scanning mechanism and the top of the base printer, the second section being downstream of the fuser mechanism and upstream of the media output tray, the media path further including a duplex section located proximally and substantially parallel to the first section;

an access door mounted on the front side of the base printer, the access door movable between a closed orientation and an open orientation to access the first section of the media path and the duplex section, the access door substantially forming the front side of the base printer; and a control panel positioned on the access door, the control panel facing in a first direction when the access door is in the closed orientation and facing in a second direction when the access door is in the open orientation;

wherein the scanning mechanism is pivotally attached to the base printer and movable between a first position with the scanning bed being substantially parallel to the input tray and a second position with the scanning bed at an inclined angle relative to the input tray, and wherein moving the scanning mechanism in the second position provides a simultaneous access to the second section of the media path and to a plurality of toner reservoirs within the base printer.

20. The device of claim 19, further comprising a laser printhead, a plurality of image forming units, a plurality of toner reservoirs, discharge rollers downstream of the fuser mechanism and at least one set of rollers downstream of the discharge rollers and upstream of the media output tray, the image forming units and the toner reservoirs being substantially horizontally disposed within the base printer.

21. The device of claim 20, wherein the scanning mechanism is pivotally mounted to the base printer and is the only mechanism needing to be moved in order to manually access the second section of the media path between the discharge rollers and the at least one set of rollers, and the plurality of toner reservoirs.

22. The device of claim 19, wherein the second section of the media path is substantially horizontally positioned, and the media output tray is disposed at an angle of about 60 degrees relative to the second section of the media path.

* * * * *